US009075644B2

(12) United States Patent
Hall et al.

(10) Patent No.: US 9,075,644 B2
(45) Date of Patent: *Jul. 7, 2015

(54) SECURE RECURSIVE VIRTUALIZATION (75) Inventors: William E. Hall, Clinton, CT (US);
Guerney D. H. Hunt, Yorktown Heights, NY (US); Paul A. Karger, Chappaqua, NY (US); Suzanne K. McIntosh, Clifton, NJ (US); Mark F. Mergen, Mount Kisco, NY (US); David R. Safford, Brewster, NY (US); David C. Toll, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 358 days.

This patent is subject to a terminal disclaimer.

(21) Appl. No.: 13/603,643

(22) Filed: Sep. 5, 2012

(65) Prior Publication Data
US 2012/0331466 A1    Dec. 27, 2012

Related U.S. Application Data (63) Continuation of application No. 12/537,808, filed on Aug. 7, 2009, now Pat. No. 8,286,164.

(51) Int. Cl.
*G06F 9/455* (2006.01)
*G06F 9/50* (2006.01)
*G06F 21/57* (2013.01)

(52) U.S. Cl.
CPC .......... *G06F 9/45533* (2013.01); *G06F 9/5077* (2013.01); *G06F 21/57* (2013.01); *G06F 2009/4557* (2013.01); *G06F 2009/45579* (2013.01)

(58) Field of Classification Search
None
See application file for complete search history.

(56) References Cited

U.S. PATENT DOCUMENTS

| 4,253,145 | A | 2/1981 | Goldberg |
| 4,456,954 | A | 6/1984 | Bullions, III et al. |
| 7,069,442 | B2 | 6/2006 | Sutton et al. |
| 7,127,548 | B2 | 10/2006 | Bennett et al. |
| 7,278,030 | B1 | 10/2007 | Chen et al. |
| 8,286,164 | B2 * | 10/2012 | Hall et al. ......................... 718/1 |
| 2003/0037089 | A1 * | 2/2003 | Cota-Robles et al. ............ 709/1 |
| 2003/0061254 | A1 * | 3/2003 | Lindwer et al. ................... 709/1 |
| 2006/0123416 | A1 * | 6/2006 | Cibrario Bertolotti et al. ... 718/1 |

(Continued)

OTHER PUBLICATIONS

Application Serial No.

(Continued)

*Primary Examiner* — Kenneth Tang
(74) *Attorney, Agent, or Firm* — Francis Lammes; Stephen J. Walder, Jr.; Jennifer R. Davis (57) ABSTRACT A mechanism is provided for performing secure recursive virtualization of a computer system. A portion of memory is allocated by a virtual machine monitor (VMM) or an operating system (OS) to a new domain. An initial program for the new domain is loaded into the portion of memory. Secure recursive virtualization firmware (SVF) in the data processing system is called to request that the new domain be generated. A determination is made as to whether the call is from a privileged domain or a non-privileged domain. Responsive to the request being from a privileged domain, all access to the new domain is removed from any other domain in the data processing system. Responsive to receiving an indication that the new domain has been generated, an execution of the initial program is scheduled.

13 Claims, 7 Drawing Sheets

(56) References Cited

U.S. PATENT DOCUMENTS

| | | | |
|---|---|---|---|
| 2007/0106986 A1* | 5/2007 | Worley, Jr. ................... | 718/1 |
| 2009/0113424 A1* | 4/2009 | Chen et al. .................. | 718/1 |
| 2009/0320048 A1* | 12/2009 | Watt et al. .................. | 719/319 |
| 2010/0082991 A1* | 4/2010 | Baldwin et al. ............ | 713/176 |
| 2011/0035532 A1 | 2/2011 | Hall et al. | |

OTHER PUBLICATIONS http://domino.watson.ibm.com/comm/pr.nsf/pages/news.20060410_security.html, Apr. 10, 2006, 1 page.

"IBM Virtual Machine Facility/370: System Logic and Problem Determination Guide", File No. S370-36, Order No. SY20-0866-1, Second Edition, Mar. 1979, 222 pages.

"IBM Virtual Machine Facility/370: System Logic and Problem Determination Guide", File No. S370-36, Order No. SY20-0866-1, Second Edition, Mar. 1979, 209-438 pages.

"IBM Virtual Machine Facility/370: Data Areas and Control Block Logic", IBM forms SY20-0884, 1976, and SY20-0886, 1977, 317 pages.

"Power ISA (Instruction Set Architecture)", Version 2.05, IBM Corporation, http://www.ibm.com, Oct. 23, 2007, 161 pages.

Bell, D.E. et al., "Secure Computer System: Unified Exposition and Multics Interpretation", ESD-TR-75-306, Mar. 1976, The MITRE Corporation, Bedford, MA: HQ Electronic Systems Division, Hanscom AFB, MA. URL: http://csrc.nist.gov/publications/history/bell76.pdf, 1976, 134 pages.

Biba, K.J., "Integrity Considerations for Secure Computer Systems", ESD-TR76-732, Apr. 1977, The MITRE Corporation, Bedford, MA: HQ Electronic Systems Division, Hanscom AFB, MA, 1977, 68 pages.

Karger, Paul A. et al., "An Augmented Capability Architecture to Support Lattice Security and Traceability of Access", Proceedings of the 1984 Symposium on Security and Privacy, Apr. 29-May 2, 1984, Oakland, CA: IEEE Computer Society, 1984 pp. 2-12.

Karger, Paul A., "Improving Security and Performance for Capability Systems", Computer Laboratory Technical Report No. 149, Oct. 1988, University of Cambridge: Cambridge, England, http://domino.research.ibm.com/comm/research_people.nsf/pages/karger.pubs.html/$FILE/trthesis.pdf, 1988, 297 pages.

Lampson, B.W., ""Protection"", in Proc. Fifth Princeton Symposium on Information Sciences and Systems, Princeton University, Mar. 1971, pp. 437-443, reprinted in Operating Systems Review 8, Jan. 1, 1974, p. 18-24.

Levy, Henry M., "Capability-Based Computer Systems", Maynard, Mass: Digital Press. ISBN 0-932376-22-3, 1984, 229 pages.

Lie, David et al., "Implementing an Untrusted Operating System on Trusted Hardware", Proceedings SOSP'03, Oct. 19-22, 2003, Bolton Landing, NY: ACM, p. 178-192.

Schroeder, Michael D. et al., "A Hardware Architecture for Implementing Porteciton Rings", Communications of the ACM, Mar. 1972, vol. 15, No. 3, pp. 157-170.

Schroeder, Michael D. et al., "Cooperation of Mutually Suspicious Subsystems in a Computer Utility", Ph.D Thesis, Dept. of Electrical Engineering, MAC TR-104, Sep. 1972, Massachusetts Institute of Technology: Cambridge, MA, http://www.lcs.mit.edu/publications/pubs/pdf/MIT-LCS-TR-104.pdf., 174 pages.

* cited by examiner

SECURE RECURSIVE VIRTUALIZATION

BACKGROUND

The present application relates generally to an improved data processing apparatus and method and more specifically to an apparatus and method for performing secure recursive virtualization of a computer system.

One of the most significant issues in computer systems is security. Security mechanisms are designed to protect the integrity, secrecy, and availability of a system and data within the system. These protections are typically provided by a combination of hardware methods, such as protected memory in which page tables define the allowed access for a context to a given page of memory, and software techniques in the operating system. Software mandatory access control systems may also include mathematical models for secrecy protection and integrity protection.

However, existing hardware and software security mechanisms have significant limitations. With typical hardware based protected memory, while access is controlled to the data when the data is in memory, once the data is loaded into registers in the processor, access is no longer controlled by the hardware, so security is dependent on the operating system software being correct. Similarly, all software based systems are dependent on correctness of the implementation of the software. As typical operating systems have many millions of lines of code, ensuring that all of this code is correct under all conditions is difficult.

More importantly, there is an implied hierarchy of trust in existing software based security mechanisms. Applications trust the operating system that generated their processes and operating systems trust the virtualization mechanism that generated their virtual machines. This trust is necessary for the functions of granting resources and providing services that virtualization mechanisms do for operating systems and that operating systems do for applications, since these are the main functions of virtualization mechanisms and operating systems. However, existing architectures also allow virtualization mechanisms and operating systems unlimited access to the memory and register state of the operating systems and applications they generate. This access is not necessary but is rather the result of the historical evolution of processor and virtualization architectures, for example, software that saves and loads registers to switch contexts and software that constructs page tables used by hardware to control memory access.

SUMMARY

In one illustrative embodiment, a method, in a data processing system, is provided for performing secure recursive virtualization of the data processing system. The illustrative embodiment allocates a portion of memory allocated to the virtual machine monitor (VMM) or the operating system (OS) to the new domain in response to a condition being met to generate a new domain. The illustrative embodiment loads an initial program for the new domain into the portion of memory. The illustrative embodiment calls secure recursive virtualization firmware (SVF) in a data processing system to request that the new domain be generated. The illustrative embodiment determines whether the call is from a privileged domain or a non-privileged domain in response to receiving the call to generate the new domain from either the VMM or the OS. In the illustrative embodiment, the privileged domain is authorized to generate either another privileged domain or a non-privileged domain. In the illustrative embodiment, the non-privileged domain is not authorized to generate either a privileged domain or another non-privileged domain. The illustrative embodiment removes all access to the new domain from any other domain in the data processing system in response to the request being from the privileged domain. The illustrative embodiment schedules an execution of the initial program in response to receiving an indication from the SVF that the new domain has been generated.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for encapsulating functions critical to security, such as processor state saving, context switching, and construction of tables that control access to virtual memory, entirely within a hardware and firmware implementation. The memory containing the state of these functions may be accessed only by the hardware and firmware, not by any software.

The hardware/firmware interfaces provided by the illustrative embodiments allow privileged domains or logical partitions, executing traditional privileged software such as virtual machine monitors and operating systems, to: generate domains for other software and assign them resources, generate virtual memory segments, handle interrupts and calls from the domains they generate, assign memory pages to resolve page faults in virtual segments they generate, cause context switching between themselves and the domains they generate, and similar privileged functions. However, the register and memory state of any domain, privileged or not, is accessible only by the domain itself and not by any other domain, not even the generating domain, except as explicitly authorized by policy.

In the illustrative embodiments, privileged domains may generate other privileged domains, providing a recursive property. That is, by a privileged domain generating another privileged domain, then the newly generated privileged domain may also generate another privileged domain. Thus, the recursive property of the illustrative embodiments may be applied repeatedly by each privileged domain. Privileged domains may also generate non-privileged domains, intended to execute application software. Non-privileged domains may not directly invoke privileged hardware/firmware functions but may request services from their generating domain or through other authorized inter-domain calls.

Figure 1:
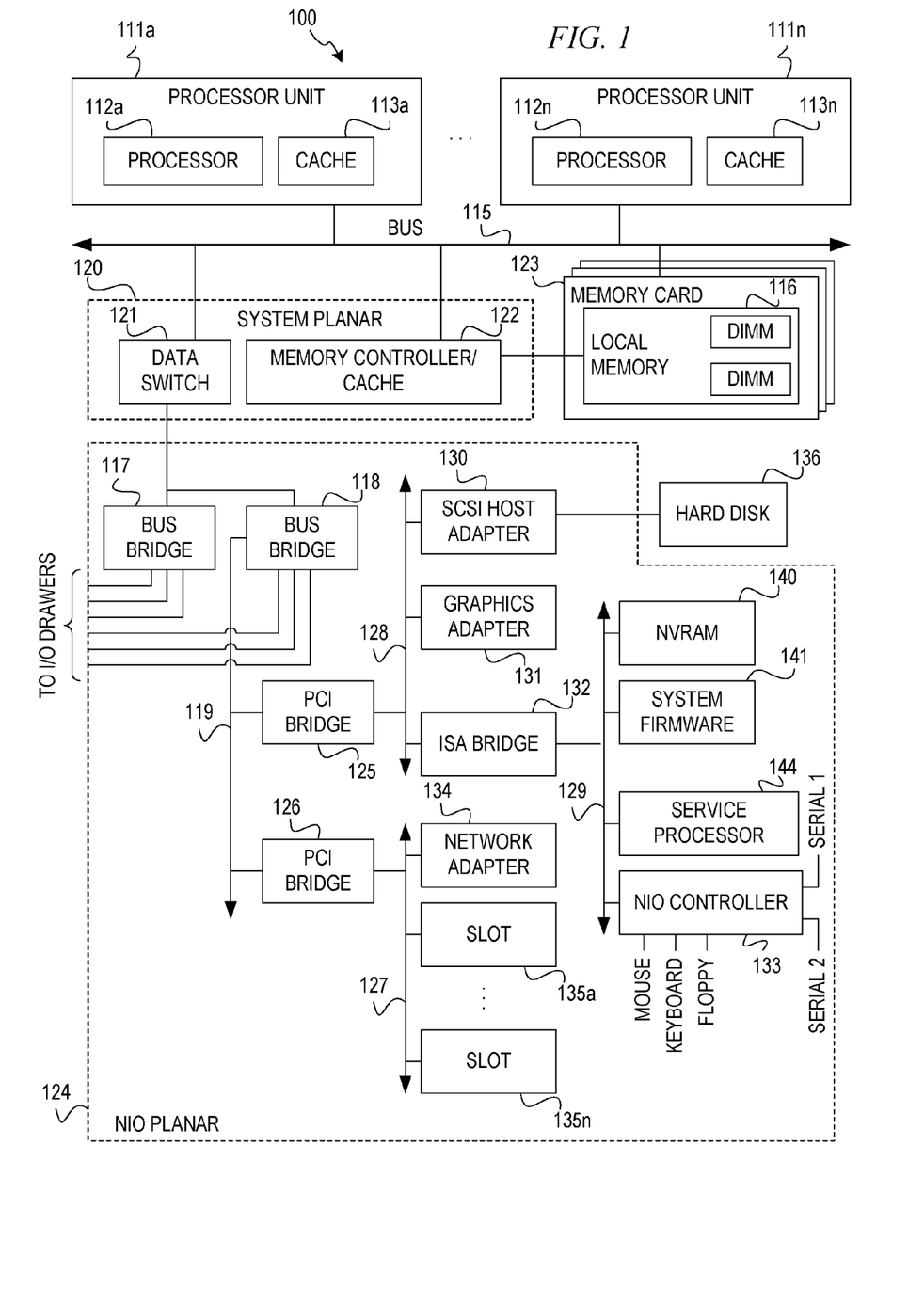
FIG. 1 depicts a block diagram of a data processing system with which aspects of the illustrative embodiments may advantageously be utilized.
Figure 2:
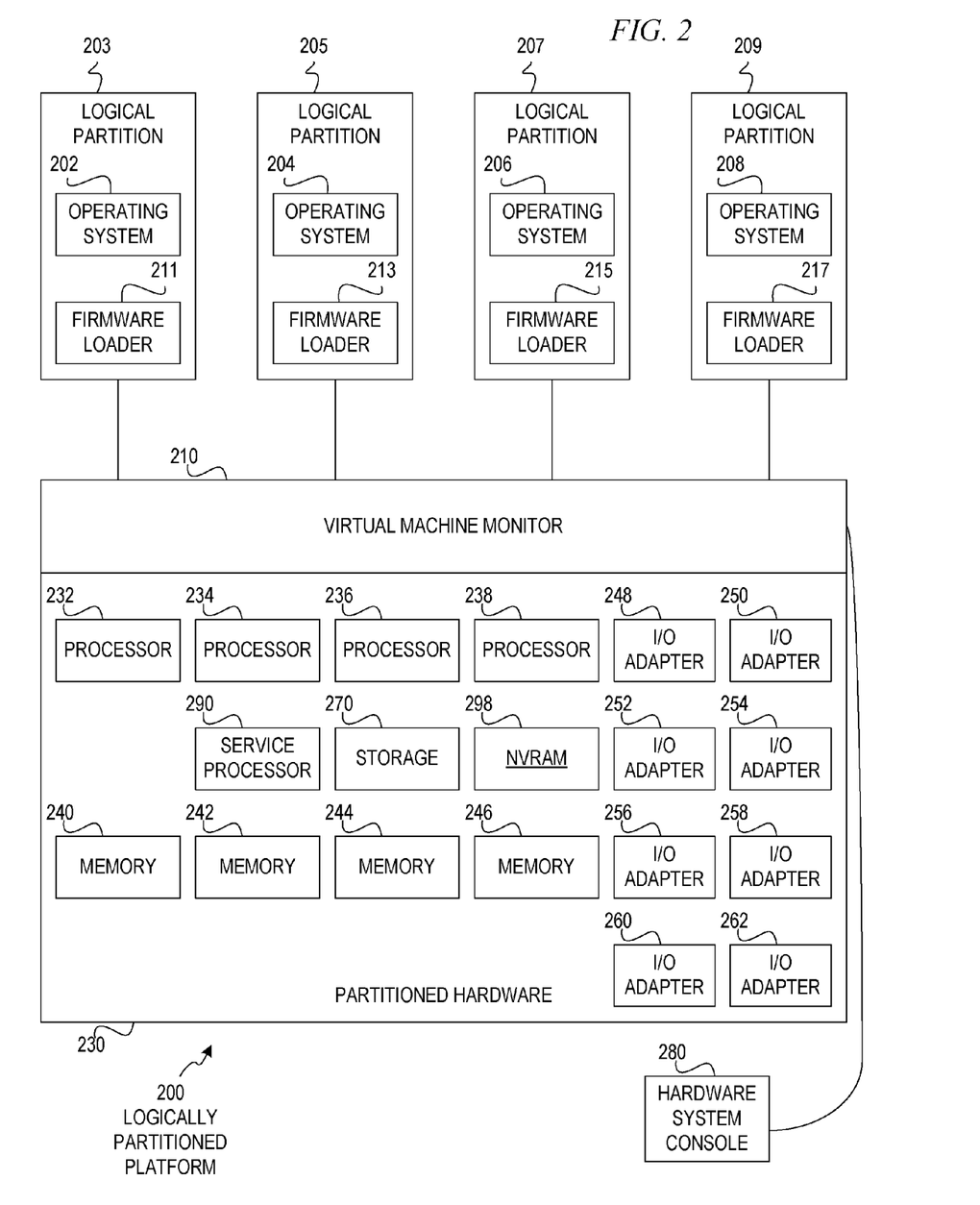
FIG. 2 depicts a block diagram of an exemplary logically partitioned platform in which the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a secure recursive virtualization mechanism, this is only an example and is not intended to state or imply any limitation with regard to the features of the present invention. To the contrary, the illustrative embodiments are intended to include distributed data processing environments and embodiments in which a secure recursive virtualization mechanism may be implemented.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

In the illustrative embodiments, a computer architecture is implemented as a combination of hardware and software. The software part of the computer architecture may be referred to as microcode or millicode. The combination of hardware and software creates an instruction set and system architecture that the rest of the computer's software operates on, such as Basic Input/Output System (BIOS), Virtual Machine Monitors (VMM), Hypervisors, applications, etc. The computer architecture created by the initial combination is immutable to the computer software (BIOS, etc), except through defined interfaces which may be few.

Referring now to the drawings and in particular to FIG. 1, there is depicted a block diagram of a data processing system with which aspects of the illustrative embodiments may advantageously be utilized. As shown, data processing system 100 includes processor units 111a-111n. Each of processor units 111a-111n includes a processor and a cache memory. For example, processor unit 111a contains processor 112a and cache memory 113a, and processor unit 111n contains processor 112n and cache memory 113n.

Processor units 111a-111n are connected to main bus 115. Main bus 115 supports system planar 120 that contains processor units 111a-111n and memory cards 123. System planar 120 also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. Graphics adapter 131 may be directly or indirectly connected to PCI bus 128. PCI bridge 126 provides connections for external data streams through network adapter 134 and adapter card slots 135a-135n via PCI bus 127.

Industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140, connected to ISA bus 129, provides a non-volatile memory for preserving certain types of data from system disruptions or system failures, such as power supply problems. System firmware 141 is also connected to ISA bus 129 for implementing the initial Basic Input/Output System (BIOS) functions. Service processor 144 connects to ISA bus 129 to provide functionality for system diagnostics or system servicing.

The operating system (OS) is stored on hard disk 136, which may also provide storage for additional application software for execution by a data processing system. NVRAM 140 is used to store system variables and error information for field replaceable unit (FRU) isolation. During system startup, the bootstrap program loads the operating system and initiates execution of the operating system. To load the operating system, the bootstrap program first locates an operating system kernel image on hard disk 136, loads the OS kernel image into memory, and jumps to an initial address provided by the operating system kernel. Typically, the operating system is loaded into random-access memory (RAM) within the data processing system. Once loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN). As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an exemplary logically partitioned platform is depicted in which the illustrative embodiments may be implemented. The hardware in logically partitioned platform 200 may be implemented, for example, using the hardware of data processing system 100 in FIG. 1.

Logically partitioned platform 200 includes partitioned hardware 230, operating systems 202, 204, 206, 208, and virtual machine monitor 210. Operating systems 202, 204, 206, and 208 may be multiple copies of a single operating system or multiple heterogeneous operating systems simultaneously run on logically partitioned platform 200. These operating systems may be implemented, for example, using OS/400, which is designed to interface with a virtualization mechanism, such as partition management firmware, e.g., a hypervisor. OS/400 is used only as an example in these illustrative embodiments. Of course, other types of operating systems, such as AIX® and Linux®, may be used depending on the particular implementation. Operating systems 202, 204, 206, and 208 are located in logical partitions 203, 205, 207, and 209, respectively.

Hypervisor software is an example of software that may be used to implement platform (in this example, virtual machine monitor 210) and is available from International Business Machines Corporation. Firmware is "software" stored in a memory chip that holds its content without electrical power, such as, for example, a read-only memory (ROM), a programmable ROM (PROM), an erasable programmable ROM (EPROM), and an electrically erasable programmable ROM (EEPROM).

Logical partitions 203, 205, 207, and 209 also include partition firmware loader 211, 213, 215, and 217. Partition firmware loader 211, 213, 215, and 217 may be implemented using IPL or initial boot strap code, IEEE-1275 Standard Open Firmware, and runtime abstraction software (RTAS), which is available from International Business Machines Corporation.

When logical partitions 203, 205, 207, and 209 are instantiated, a copy of the boot strap code is loaded into logical partitions 203, 205, 207, and 209 by virtual machine monitor 210. Thereafter, control is transferred to the boot strap code with the boot strap code then loading the open firmware and RTAS. The processors associated or assigned to logical partitions 203, 205, 207, and 209 are then dispatched to the logical partition's memory to execute the logical partition firmware.

Partitioned hardware 230 includes a plurality of processors 232-238, a plurality of system memory units 240-246, a plurality of input/output (I/O) adapters 248-262, and storage unit 270. Each of the processors 232-238, memory units 240-246, NVRAM storage 298, and I/O adapters 248-262 may be assigned to one of multiple logical partitions 203, 205, 207, and 209 within logically partitioned platform 200, each of which corresponds to one of operating systems 202, 204, 206, and 208.

Virtual machine monitor 210 performs a number of functions and services for logical partitions 203, 205, 207, and 209 to generate and enforce the partitioning of logical partitioned platform 200. Virtual machine monitor 210 is a firmware implemented virtual machine identical to the underlying hardware. Thus, virtual machine monitor 210 allows the simultaneous execution of independent OS images 202, 204, 206, and 208 by virtualizing all the hardware resources of logical partitioned platform 200.

Service processor 290 may be used to provide various services, such as processing of platform errors in logical partitions 203, 205, 207, and 209. Service processor 290 may also act as a service agent to report errors back to a vendor, such as International Business Machines Corporation. Operations of the different logical partitions may be controlled through a hardware system console 280. Hardware system console 280 is a separate data processing system from which a system administrator may perform various functions including reallocation of resources to different logical partitions.

The illustrative embodiments provide a computer processing architecture with enhanced secure recursive virtualization features implemented in the processor hardware and firmware. Like other virtualization architectures, this architecture provides privileged domains or logical partitions to execute traditional software components, such as virtual machine monitors and operating systems, whose purpose is to allocate resources for and service requests from the other domains they generate. The illustrative embodiments also provide non-privileged domains to execute applications. However, the security property enforced by this architecture, unlike existing architectures, provides that the register and memory state of any domain, privileged or not, is accessible only by the domain itself and not by any other domain, not even the generating domain, except as explicitly authorized by policy.

In partitioned hardware of the data processing system, the hardware/firmware interfaces allow executing programs to: generate domains with resources for other software, generate virtual memory segments, handle interrupts and calls from domains it generated, assign memory pages to resolve page faults in virtual segments it generated, cause context switching between itself and domains it generated, and similar privileged functions. A privileged domain may generate other privileged domains and may also generate non-privileged domains. By a privileged domain generating another privileged domain and the newly generated privileged domain generating another privileged domain, the illustrative embodiment provides a recursive property that may be applied repeatedly by each privileged domain.

Domains are given an initial allocation of memory by their generating domain. This memory may be used by a generated domain or, if the generated domain is privileged, it may generate other domains and give part of its memory to them as initial allocations. A privileged domain may also generate virtual memory segments to use itself or give to generated domains. A page fault in a virtual segment is reflected by hardware/firmware to the domain that generated the segment, and that domain must resolve the fault by assigning a page in the initial allocation of memory from its generating domain, to assure that virtual memory recursion will eventually be terminated by assignment of a real memory page. In effect, a privileged domain considers its initial memory allocation to be real memory, even though it may be virtual memory generated by one of its ancestors.

Figure 3:
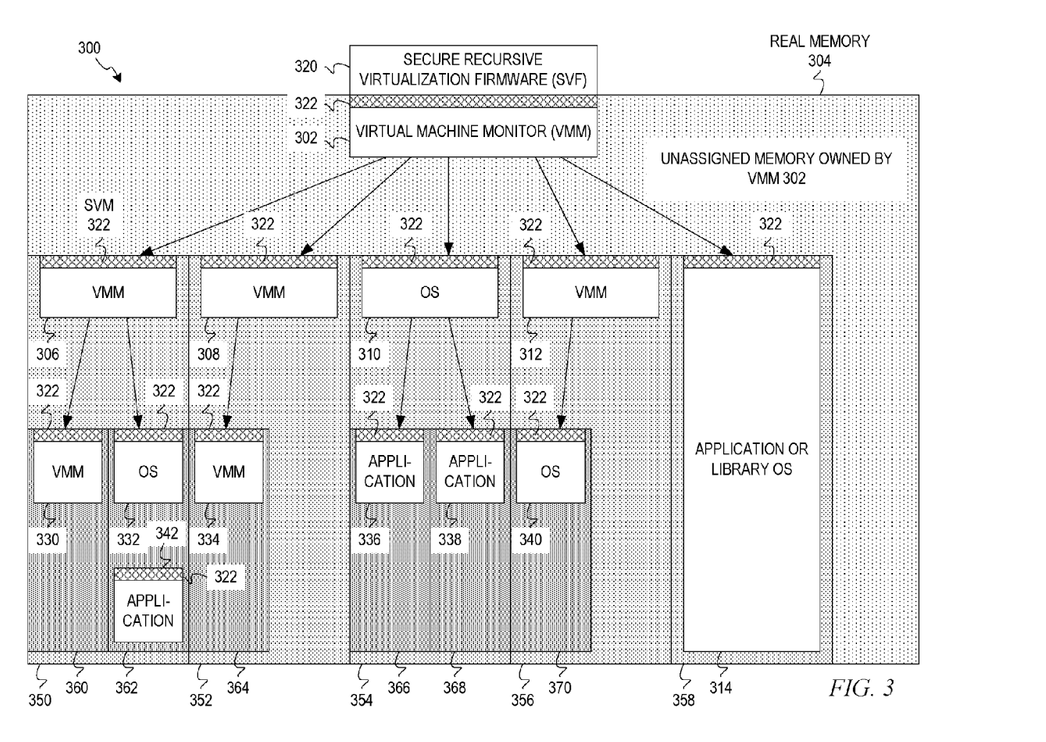
FIG. 3 depicts a block diagram of how a virtual machine monitor exploits the secure recursive virtualization mechanism to allocate real memory in accordance with an illustrative embodiment.

FIG. 3 depicts a block diagram of how a virtual machine monitor exploits the secure recursive virtualization mechanism to allocate real memory in accordance with an illustrative embodiment. Data processing system 300 comprises secure recursive virtualization firmware/microcode (SVF) 320 that is not seen by a memory system of one or more processors in data processing system 300. SVF 320 effectively resides outside the space and part of the architecture that is virtualized in data processing system 300. As data processing system 300 is initialized, secure recursive virtualization firmware metadata (SVM) 322 and virtual machine monitor (VMM) 302, which is a privileged domain, are loaded into real memory 304. VMM 302, which is the initial VMM such as virtual machine monitor 210 of FIG. 2, owns all of real memory 304, such as memory 240, 242, 244, and 246 of FIG. 2. In order to provide secure recursive virtualization, VMM 302 may generate and load one or more privileged domains 306, 308, 310, and 312, which may be referred to as virtual machine monitor (VMM) domains or operating system (OS) domains, and/or non-privileged domain 314, which may be referred to as application domain or a library OS domain. VMM 302 generates privileged or non-privileged domains using interfaces provided by SVF 320. VMM 302, or any other privileged domain, may generate a privileged or non-privileged domain based on a request from another OS, VMM, or application; when a condition is met that requires the generation of a privileged or non-privileged domain; an indication from a user or administrator that a privileged or non-privileged domain is to be generated; or the like. These interfaces are only available to privileged domains. The number of privileged domains and non-privileged domains VMM 302 generates may be dependent upon the number of requests VMM 302 receives to instantiate a privileged domain and/or a non-privileged domain.

As an example, if VMM 302 requests generation of four privileged domains and one non-privileged domain, VMM 302 uses the interfaces provided by SVF 320 to generate these domains. VMM 302 allocates a portion of its real memory 304 to each of privileged domains 306, 308, 310, and 312 and non-privileged domain 314, indicated by memory allocations 350, 352, 354, 356, and 358, respectively. VMM 302 then loads the initial programs for each of privileged domains 306, 308, 310, and 312 and non-privileged domain 314. After setting aside memory and loading the initial programs for privileged domains 306, 308, 310, and 312 and non-privileged domain 314, VMM 302 calls SVF 320 to generate the domains.

If any of privileged domains 302, 306, 308, 310, or 312 requests generation of a new domain, privileged or non-privileged, privileged domains 302, 306, 308, 310, or 312 call SVF 320 to generate the domain. Prior to calling SVF 320, the privileged domain decides which part of its memory the privileged domain wants to dedicate to the new domain, loads the initial code into this memory, (the initial code may be a boot strap loader), and then calls the generate domain interface of SVF 320, indicating the type of domain, the amount of memory, and the address of the initial code. SVF 320 reserves space for metadata 322, separates the new domain's memory from the generating domain, and returns an indication to the privileged domain that requested generation that the new domain has been generated.

Thus, domains 306, 308, 310, 312, and 314 are given an initial allocation of memory by their generating domain, which in this instance is VMM 302. This memory allocation may be used by the generated domain or, if the generated domain is privileged, the privileged domain may generate other privileged and non-privileged domains and give part of its memory to them as initial allocations which they may then allocate to other domains. A privileged domain may also generate virtual memory segments to use itself or give to generated domains. In effect, a privileged domain considers its initial memory allocation to be real memory, even though it may be virtual memory generated by one of its ancestors.

Once each of privileged domains 306, 308, 310, and 312 are loaded and has an allocated portion of real memory 304, each privileged domain 306, 308, 310, or 312 may generate other privileged domains and/or non-privileged domains; however, non-privileged domain 314 may not generate other domains. Non-privileged domains may run and request services from the privileged domain that generated the domain, for domain 314 the generating privileged domain is VMM 302, or from any other domain if the inter-domain call is authorized. In this exemplary illustration, privileged domain 306 generates and loads privileged domains 330 and 332, privileged domain 308 generates and loads privileged domain 334, privileged domain 310 generates two non-privileged application domains 336 and 338, and privileged domain 312 generates and loads privileged domain 340. Domains 336 and 338 and non-privileged domain 314 may run an application or a library OS (an application that runs on the bare hardware, such as the virtual environment supplied by VMM 302). After loading each of the privileged domains and non-privileged domains, privileged domains 306, 308, 310, and 312 allocate a portion of their respective memory allocations 350, 352, 354, and 356 to privileged domains 330, 332, 334, and 340 and to non-privileged domains 336 and 338 indicated by memory allocations 360, 362, 364, 366, 368, and 370, respectively. Also in this exemplary illustration, privileged domain 332 generates non-privileged application domain 342. After privileged domain 332 loads non-privileged domain 342, privileged domain 332 allocates a portion of its memory to non-privileged domain 342 (not shown).

Thus, each generated privileged domain may generate additional privileged domains and/or non-privileged domains upon request to instantiate one or more privileged domains and/or one or more non-privileged domains and allocate a portion of its allocated memory to the generated privileged domain(s) and/or non-privileged domain(s).

Secure recursive virtualization firmware (SVF) 320 keeps the state of real memory 304, including saved domain registers and memory addressing assignments. In order to keep the state of real memory 304, SVF 320 reserves secure recursive virtualization metadata (SVM) blocks 322 in each privileged and non-privileged domain generated, such as privileged domains 306, 308, 310, 312, 330, 332, 334, and 340 and non-privileged domains 314, 336, 338, and 342. SVM blocks 322 are completely hidden from all privileged domains or non-privileged domains.

The register and memory state stored in SVM blocks 322 of each of privileged domains 306, 308, 310, 312, 330, 332, 334, and 340 and non-privileged domains 314, 336, 338, and 342 as well as any other generated privileged domain or non-privileged domain is completely isolated and protected from access by any other privileged domain or non-privileged domain. The hardware/firmware interfaces for segments, interrupts, pages, and contexts by default do not allow any access to the state of the resources generated, assigned, or controlled by another domain. A domain, either privileged or non-privileged, may request that access be granted to its memory, but not to its associated SVM control block 322. Whenever SVF 320 receives a request from a privileged or non-privileged domain for access to memory to be granted from some privileged or non-privileged domain to another privileged or non-privileged domain, SVF 320, after confirming that the memory is under the control of the requesting domain, passes the request onto a specific domain, referred to as a reference monitor. In a preferred embodiment, SVF 320 may only allow domains to request access be granted to memory that is under their immediate control. If a domain has generated a sub-domain, the domain no longer has the ability to grant access to the sub-domain's memory or to any other domain. In this illustrative embodiment, the reference monitor is VMM 302. VMM 302 determines whether the access should be granted. VMM 302 may verify a policy if data processing system 300 is a highly secure system or, if data processing system 300 is a simple system; VMM 302 may either grant or deny all access based on a predetermined setting. If the request is valid, the reference monitor will send an indication to the SVF 320 to grant the request, SVF 320 makes the necessary changes to fulfill the request. When resources are assigned by a privileged domain to another privileged domain or non-privileged domain and are later reclaimed by or returned to the original privileged domain, the state of the resource is destroyed and set to an initial state. For non-privileged domains executing applications, the applications may not invoke privileged hardware/firmware functions directly but may request services from the generating privileged domain or from other domains through authorized inter-domain calls.

Calls to hardware/firmware that require a policy decision, such as to authorize an inter-domain call channel with parameter passing or sharing of a virtual segment between domains, cause the hardware/firmware to invoke a distinguished domain, which may be referred to as a reference monitor, to make the decision, which hardware/firmware then enforces. Any parameters to which access is granted as part of an inter-domain call, are granted only for the duration of the call by default unless other access has been explicitly authorized. For illustration in this embodiment, the reference monitor is VMM 302. The default assumption of SVF 320 is that the initial domain is the reference monitor. The initial domain may assign the responsibilities of the reference monitor to a sub-domain that the initial domain has generated. Once assigned, the initial domain may not reclaim the responsibility unless the sub-domain releases the responsibility. In an alternate embodiment, data processing system 300 may allow for multiple reference monitors. However, each domain may only be under the control of a single reference monitor.

Thus, the illustrative embodiments provide a computer processing architecture with enhanced secure recursive virtualization features implemented in the processor hardware and firmware. Like other virtualization architectures, this architecture provides privileged domains or logical partitions to execute traditional software components, such as virtual machine monitors and operating systems, whose purpose is to allocate resources for and service requests from the other domains they generate. The illustrative embodiments also provide non-privileged domains to execute applications.

Figure 4:
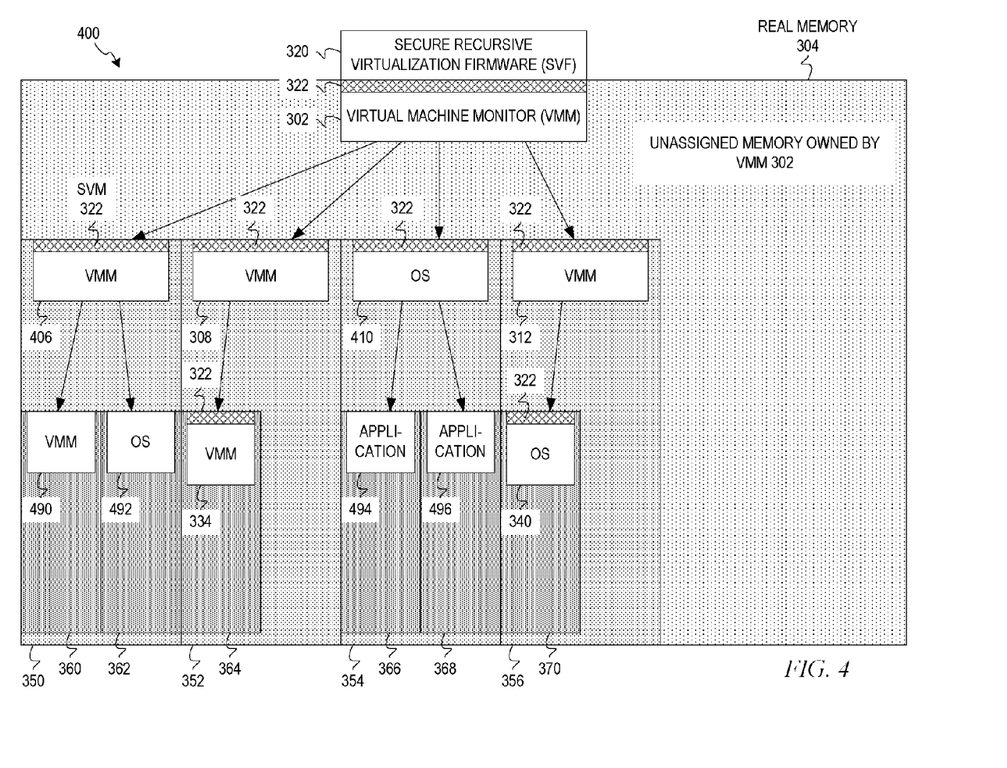
FIG. 4 depicts a block diagram of protected and non-protected domain coexistence in accordance with an illustrative embodiment.

FIG. 4 depicts a block diagram of protected and non-protected domain coexistence in accordance with an illustrative embodiment. With reference to FIG. 4, data processing system 400 includes, in addition to the elements particular to the illustrative embodiments, elements that are similar to elements depicted in data processing system 300 of FIG. 3. Thus, elements in FIG. 4 that are not specifically described as operating differently from elements in FIG. 3 are intended to operate in a similar manner as their corresponding elements in FIG. 3. In this illustrative embodiment the initial VMM 302 receives requests to generate four privileged domains 406, 308, 410, and 312. However, VMM 302 loads domain 406 with an unmodified VMM, such as VMware®, that does not take advantage of SVF when generating virtual machine monitor 490 or operating system 492. Similarly VMM 302 loads an unmodified operating system, such as Windows®, into privileged environment 410 that does not take advantage of SVF when generating applications 494 and 496. In this environment all of the privileged domains generated by VMM 302 are fully protected from one another. However, VMM 490 and OS 492 are not protected from VMM 406. Similarly application 494 and application 496 are not protected from OS 410. For virtual machine monitors and operating systems that do not exploit secure recursive virtualization firmware (SVF), the protections they afford to generated VMMs, OSs, and applications are the same as exist today.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5:
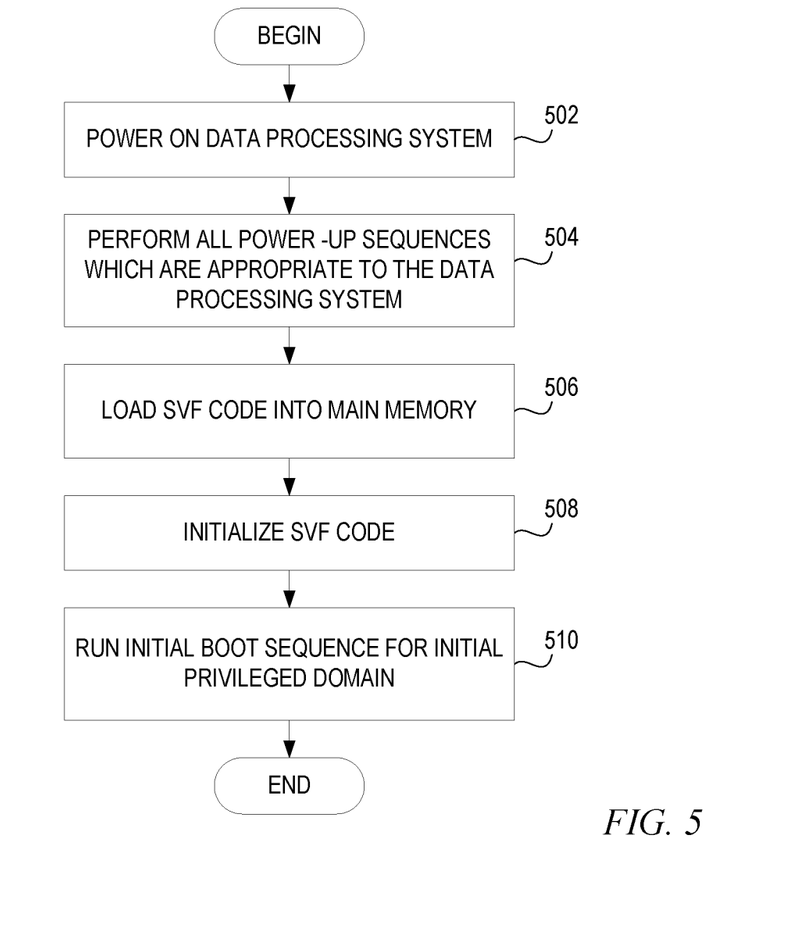
FIG. 5 depicts the initialization of the SVF firmware in the processor boot sequence in accordance with an illustrative embodiment.

FIG. 5 depicts the initialization of the SVF firmware in the processor boot sequence in accordance with an illustrative embodiment. As the operation begins, the data processing system is powered on (step 502). The data processing system then performs all power-up sequences which are appropriate to the data processing system (step 504). At some point, if secure recursive virtualization firmware (SVF) is not already resident in the data processing system's microcode or millicode memory, the data processing system loads the SVF code into main memory (step 506). The data processing system then initializes the SVF code (step 508), the SVF code reserves an area of main memory for SVF metadata that is associated with an initial privileged domain. The data processing system then runs the initial boot sequence, which may also be referred to as an initial program load, for the initial privileged domain (step 510), with the operation ending thereafter. Thus, the initial privileged domain is now running.

Figure 6:
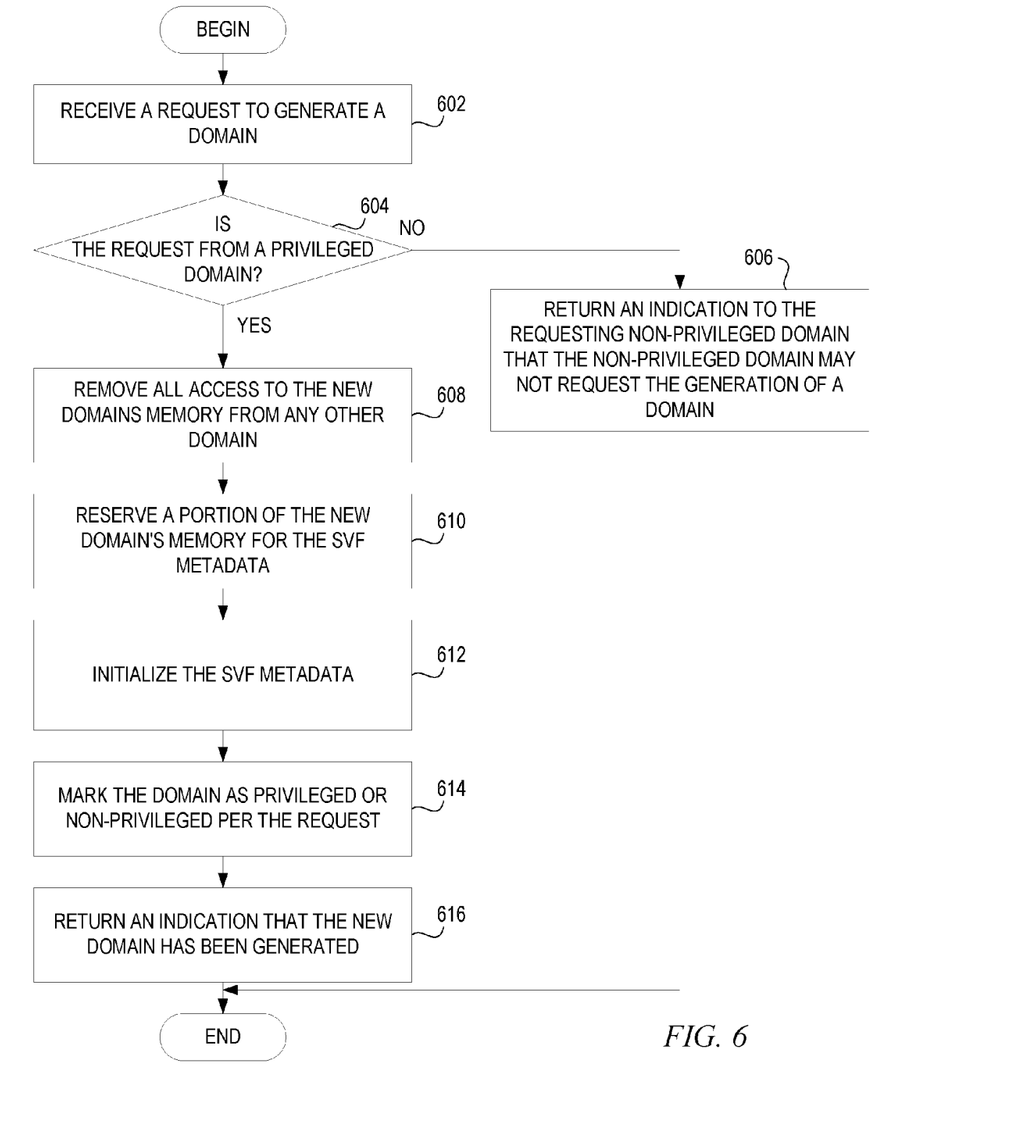
FIG. 6 depicts a exemplary flow diagram of the domain generation operation performed by a secure recursive virtualization mechanism in accordance with an illustrative embodiment.

FIG. 6 depicts an exemplary flow diagram of the domain generation operation performed by a secure recursive virtualization mechanism in accordance with an illustrative embodiment. As the operation begins, the secure recursive virtualization firmware (SVF) receives a request to generate a domain (step 602). The SVF then determines whether the request is from a privileged domain (step 604). If at step 604 the request is not from a privileged domain, the SVF returns an indication to the requesting non-privileged domain that the non-privileged domain may not request the generation of a domain (step 606), with the operation terminating thereafter. If at step 604 the request is from a privileged domain, the SVF removes all access to the new domain's memory from any other domain (step 608). Next, the SVF reserves a sub-portion of the new domain's memory for the SVF metadata (step 610). The SVF then initializes the SVF metadata (step 612). The SVF then marks the new domain as either privileged or non-privileged per the request (step 614). Finally, the SVF returns an indication that the new domain has been generated (step 616), with the operation terminating thereafter.

Figure 7:
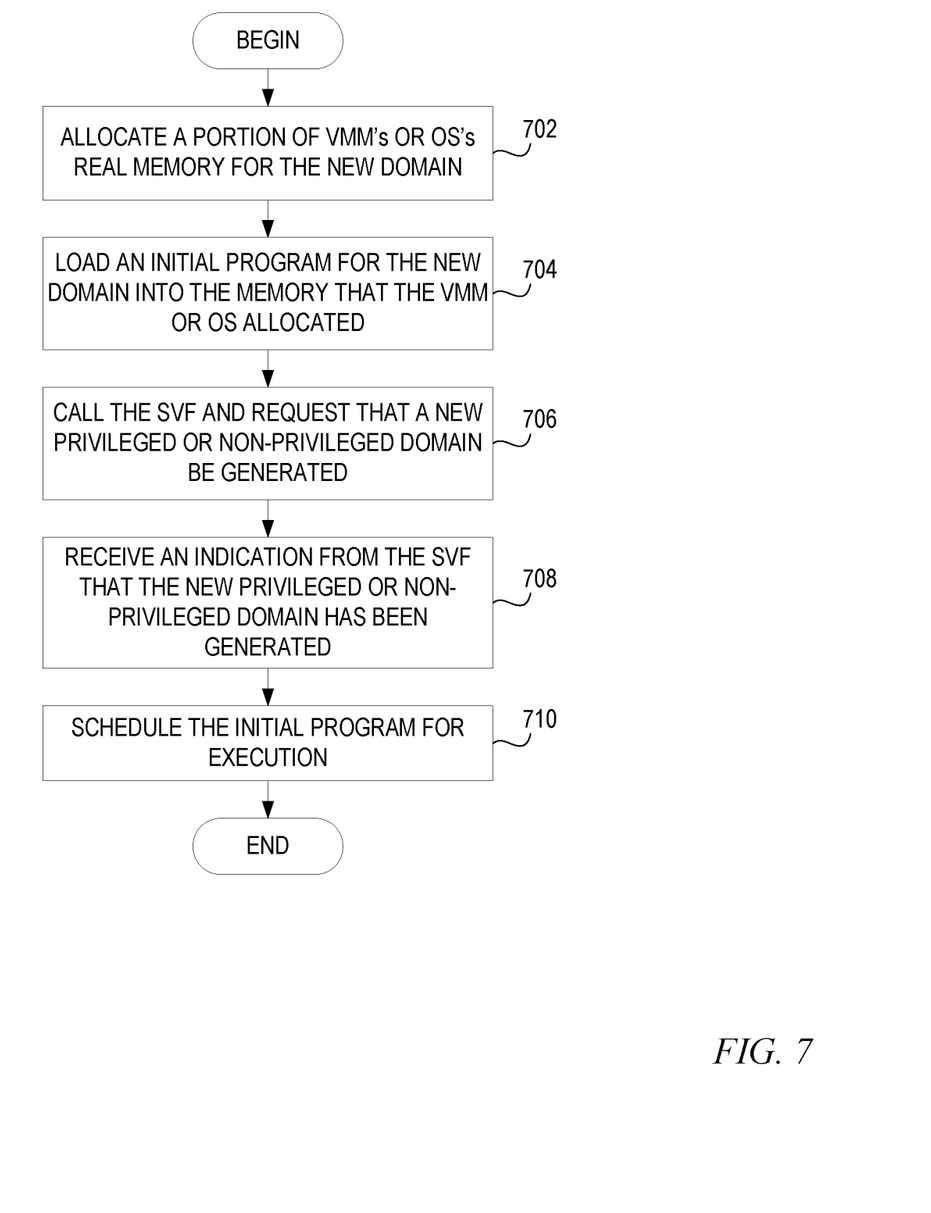
FIG. 7 depicts how a virtual machine monitor (VMM) or operating system (OS) uses the domain generation function of SVF in accordance with an illustrative embodiment.

FIG. 7 depicts how a virtual machine monitor (VMM) or operating system (OS) uses the domain generation function of SVF in accordance with an illustrative embodiment. In this operation, the VMM or OS must be running in a privileged domain. As the operation begins, the VMM or OS allocates a portion of its real memory for the new domain (step 702). The VMM or OS then loads an initial program for this new domain into the memory that the VMM or OS allocated (step 704). The VMM or OS then calls the SVF and requests that a new privileged or non-privileged domain be generated (step 706). Upon receiving an indication from the SVF that the new privileged or non-privileged domain has been generated (step 708), the VMM or OS schedules the initial program for execution (step 710), with the operation terminating thereafter.

Any privileged domain may call SVF to generate a new privileged or non-privileged domain. In addition, there are many other functions that SVF may provide, such as generating virtual memory segments, handling interrupts and calls from domains it generated, assigning memory pages to resolve page faults in virtual segments it generated, supporting context switching between generated domains, and similar privileged functions. When these techniques are implemented or supported by SVF, the techniques have to prevent the transmission of data in registers or memory from domain to domain unless the transmission has been explicitly authorized. The SVF provides a mechanism for authorizing memory access between domains subject to policy. Similarly, the SVF may provide a mechanism that supports cross domain calls with parameter passing.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms that allow executing programs to: generate domains with resources for other software, generate virtual memory segments, handle interrupts and calls from domains it generated, assign memory pages to resolve page faults in virtual segments it generated, cause context switching between itself and domains it generated, and similar privileged functions. A privileged domain may generate other privileged domains and may also generate non-privileged domains.

Domains are given an initial allocation of memory by their generating domain. This memory allocation may be used by the generated domain or, if the generated domain is privileged, the privileged may generate other privileged or non-privileged domains and give part of its memory to them as initial allocations which they may then allocate to other domains. A privileged domain may also generate virtual memory segments to use itself or give to generated domains. A page fault in a virtual segment is reflected by hardware/firmware to the domain that generated the segment, and that domain must resolve the fault by assigning a page in the initial allocation of memory from its generating domain, to assure that virtual memory recursion will eventually be terminated by assignment of a real memory page. In effect, a privileged domain considers its initial memory allocation to be real memory, even though it may be virtual memory generated by one of its ancestors.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for performing secure recursive virtualization of the data processing system, the method comprising:
   responsive to a condition being met to generate a new domain, allocating, by either a virtual machine monitor (VMM) or an operating system (OS), a portion of memory allocated to the VMM or the OS to the new domain;
   loading, by either the VMM or the OS, an initial program for the new domain into the portion of memory;
   calling, by either the VMM or the OS, secure recursive virtualization firmware (SVF) in the data processing system to request that the new domain be generated;
   responsive to receiving the call to generate the new domain from either the VMM or the OS, determining, by the SVF, whether the call is from a privileged domain or a non-privileged domain, wherein the privileged domain is authorized to generate either another privileged domain or a non-privileged domain and wherein the non-privileged domain is not authorized to generate either a privileged domain or another non-privileged domain;
   responsive to the request being from the privileged domain, removing, by the SVF, all access to the new domain from any other domain in the data processing system;
   responsive to receiving an indication from the SVF that the new domain has been generated, scheduling, by either the VMM or the OS, an execution of the initial program;
   responsive to receiving a call from a domain for an inter-domain call channel, sending, by the SVF, the call to a reference monitor; and
   responsive to receiving an indication from the reference monitor that the inter-domain call channel is granted, establishing, by the SVF, the inter-domain call channel between the domain and another domain identified in the call, wherein the reference monitor determines if the inter-domain call channel should be granted by referencing a policy.

2. The method of claim 1, wherein the new domain is either a privileged or a non-privileged domain.

3. The method of claim 1, further comprising:
   responsive to receiving a request from a domain to grant access to its allocated portion of memory to another domain, confirming, by the SVF, that the portion of memory is under control of the domain;
   passing, by the SVF, the request to the reference monitor; and
   responsive to receiving an indication from the reference monitor to grant access, changing, by the SVF, access to the portion of memory allocated to the domain so that the other domain may access the portion of memory.

4. The method of claim 3, wherein the reference monitor determines whether access to the portion of memory should be granted based on at least one of verifying a policy of the data processing system or based on a predetermined setting of the reference monitor.

5. The method of claim 1, wherein the portion of memory allocated to the new domain is not accessible by either the VMM or the OS unless the new domain releases the portion of memory.

6. A computer program product comprising a computer readable storage medium having a computer readable program recorded thereon, wherein the computer readable program, when executed on a computing device, causes the computing device to:
   allocate a portion of memory allocated to a virtual machine monitor (VMM) or an operating system (OS) to a new domain in response to a condition being met to generate the new domain;
   load an initial program for the new domain into the portion of memory;
   call secure recursive virtualization firmware (SVF) in a data processing system to request that the new domain be generated;
   determine whether the call is from a privileged domain or a non-privileged domain in response to receiving the call to generate the new domain from either the VMM or the OS, wherein the privileged domain is authorized to generate either another privileged domain or a non-privileged domain and wherein the non-privileged domain is not authorized to generate either a privileged domain or another non-privileged domain;
   remove all access to the new domain from any other domain in the data processing system in response to the request being from the privileged domain;

schedule an execution of the initial program in response to receiving an indication from the SVF that the new domain has been generated;

send a call to a reference monitor in response to receiving the call from a domain for an inter-domain call channel; and establish the inter-domain call channel between the domain and another domain identified in the call in response to receiving an indication from the reference monitor that the inter-domain call channel is granted, wherein the reference monitor determines if the inter-domain call channel should be granted by referencing a policy.

7. The computer program product of claim 6, wherein the computer readable program further causes the computing device to:

confirm that the portion of memory is under control of the domain in response to receiving a request from a domain to grant access to its allocated portion of memory to another domain;

pass the request to the reference monitor; and change access to the portion of memory allocated to the domain so that the other domain may access the portion of memory in response to receiving an indication from the reference monitor to grant access.

8. The computer program product of claim 7, wherein the reference monitor determines whether access to the portion of memory should be granted based on at least one of verifying a policy of the data processing system or based on a predetermined setting of the reference monitor.

9. The computer program product of claim 6, wherein the portion of memory allocated to the new domain is not accessible by either the VMM or the OS unless the new domain releases the portion of memory.

10. An apparatus, comprising:

a processor; and a memory coupled to the processor, wherein the memory comprises instructions which, when executed by the processor, cause the processor to:

allocate a portion of memory allocated to a virtual machine monitor (VMM) or an operating system (OS) to a new domain in response to a condition being met to generate the new domain;

load an initial program for the new domain into the portion of memory;

call secure recursive virtualization firmware (SVF) in a data processing system to request that the new domain be generated;

determine whether the call is from a privileged domain or a non-privileged domain in response to receiving the call to generate the new domain from either the VMM or the OS, wherein the privileged domain is authorized to generate either another privileged domain or a non-privileged domain and wherein the non-privileged domain is not authorized to generate either a privileged domain or another non-privileged domain;

remove all access to the new domain from any other domain in the data processing system in response to the request being from the privileged domain;

schedule an execution of the initial program in response to receiving an indication from the SVF that the new domain has been generated;

send a call to a reference monitor in response to receiving the call from a domain for an inter-domain call channel; and establish the inter-domain call channel between the domain and another domain identified in the call in response to receiving an indication from the reference monitor that the inter-domain call channel is granted, wherein the reference monitor determines if the inter-domain call channel should be granted by referencing a policy.

11. The apparatus of claim 10, wherein the instructions further cause the processor to:

confirm that the portion of memory is under control of the domain in response to receiving a request from a domain to grant access to its allocated portion of memory to another domain;

pass the request to the reference monitor; and change access to the portion of memory allocated to the domain so that the other domain may access the portion of memory in response to receiving an indication from the reference monitor to grant access.

12. The apparatus of claim 11, wherein the reference monitor determines whether access to the portion of memory should be granted based on at least one of verifying a policy of the data processing system or based on a predetermined setting of the reference monitor.

13. The apparatus of claim 10, wherein the portion of memory allocated to the new domain is not accessible by either the VMM or the OS unless the new domain releases the portion of memory.

* * * * *